United States Patent
Wang et al.

(10) Patent No.: US 10,198,774 B1
(45) Date of Patent: Feb. 5, 2019

(54) SYSTEMS, METHODS AND ARTICLES FOR ASSOCIATING TAX DATA WITH A TAX ENTITY

(71) Applicant: INTUIT INC., Mountain View, CA (US)

(72) Inventors: Gang Wang, San Diego, CA (US); Matthew L. Sivertson, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 538 days.

(21) Appl. No.: 14/922,868

(22) Filed: Oct. 26, 2015

(51) Int. Cl.
*G06Q 40/00* (2012.01)

(52) U.S. Cl.
CPC .................. *G06Q 40/123* (2013.12)

(58) Field of Classification Search
CPC .............................. G06Q 40/00; G06Q 40/123
USPC ........................................................ 705/31
See application file for complete search history.

(56) References Cited

U.S. PATENT DOCUMENTS

| | | | | |
|---|---|---|---|---|
| 2010/0262495 A1* | 10/2010 | Dumon | ............ | G06F 17/30979 705/14.54 |
| 2012/0059819 A1* | 3/2012 | Wheeler | ........... | G06F 17/30867 707/723 |
| 2016/0042466 A1* | 2/2016 | Herndon | ................ | G06Q 40/10 705/31 |
| 2017/0270586 A1* | 9/2017 | Dumon | ............. | G06F 17/30979 |

OTHER PUBLICATIONS

Stressed Out by the Upcoming Tax Season?, Business Wire Jan. 25, 2011: NA.*

* cited by examiner

*Primary Examiner* — Lalita M Hamilton
(74) *Attorney, Agent, or Firm* — DLA Piper LLP US

(57) ABSTRACT

Systems, methods, and articles of manufacture for associated tax data in a tax data item with a tax entity to which the tax data item pertains. A computerized tax return system is configured to access a tax data item having tax data regarding a tax entity. The system stores tax entity record(s) for one or more tax entities related to a tax return. The system has a set of matching rules for matching tax data from the tax data item with key attributes of the tax entity record(s) for a respective tax topic, and a matching algorithm for utilizing the matching rules to compare utilize the matching rules to compute a matching score. The tax return system determines a matching tax entity using the matching score. The system associates the matching tax entity with the tax data and generates a normalized data set for the tax data item.

21 Claims, 4 Drawing Sheets

US 10,198,774 B1

SYSTEMS, METHODS AND ARTICLES FOR ASSOCIATING TAX DATA WITH A TAX ENTITY

BACKGROUND

The invention relates to methods, systems and apparatus for computerized preparation of tax returns; and more particularly, to new methods, systems and apparatus for associating tax data with a tax entity.

Computerized (also referred to as "electronic") tax return preparation applications (also referred to as tax preparation applications) have become very popular and allow a user, such as a taxpayer or a tax professional, to prepare and electronically file a tax return using a computing device (e.g. personal computer, tablet computer, smart phone, etc.). The tax preparation application may be a desktop application that resides and operates on the computer operated by the user or an online application that resides on a server that is accessible by the user's computer via a network such as the internet. The interface for a server based application can be an internet browser or specialized software residing on the local computer. There are a number of examples of desktop software applications and online tax preparation applications for preparing tax returns.

Whether a desktop application or an online application, the use of the application to prepare a computerized tax return is basically the same. For example, certain tax preparation applications present a list of tax-related questions or data entry fields to the user as a series of interview screens or fillable forms, in response to which the user enters the appropriate data or answers if they are known. For example, certain interview screens or questions may relate to personal and family information such as the user's social security number, marital status, number of dependents, etc. Other interview screens and questions may relate to the taxpayer's finances such as wages, retirement plan contributions, and social security, state and federal taxes that were paid or withheld as provided in Form-W2.

The data fields of an electronic tax return may be entered in many other ways, as well. For example, data may be entered into the electronic tax return by filling in data fields in a fillable form. Tax data for completing the data fields of an electronic tax return may also be electronically accessed from financial service providers of the taxpayer (such as banks, stock brokers, financial planners, etc.); tax related documents, such as prior year tax returns, tax forms (e.g., W-2s, 1099s-1099-B, 1099-DIV, 1099-INT, etc.), may be electronically accessed and tax data extracted from the documents; and tax related documents may be scanned with relevant tax data being automatically extracted using Optical Character Recognition (OCR) techniques. Tax data may also be transferred from another database on the computer or remotely stored on a different computer or storage device/server, and/or the data may be transferred from a previous year's tax return, or from any other suitable source. Each of the instances of sources of tax data are referred to herein as a "tax data item," which simply means an electronic document or data file having tax data.

Further, an electronic tax return may be a business or corporate return, and the tax data fields may, for example, relate to payments and benefits such as contributions to a retirement plan. Thus, data fields may relate to travel expenses or determinations of expenses or portions of expenses that are deductible.

Upon entry of all of the taxpayer data, the tax preparation application prepares an electronic tax return. The electronic tax return is then processed and formatted into an electronic tax return data file according to the requirements and specifications of the pertinent tax agency to which the tax return is being filed. Finally, the electronic tax return data file is filed with the appropriate tax authority such as the Internal Revenue Service (IRS), a state tax authority (e.g. California Franchise Tax Board), city tax authority, or other tax collecting agency, by transmitting the electronic tax return data file to the tax authority. Alternatively, the tax return data file can used to create a paper forms submission in which the tax return forms are printed and then submitted to the appropriate tax authority.

Upon receipt of the electronic tax return data file, the tax agency typically runs a validation on the data file to check for certain errors in the tax return. If the tax agency detects error(s), then the tax return submission is rejected, and a rejection message and an error message identifying the errors may be sent to the submitter of the tax return.

As described above, in many cases, the tax data obtained by the tax return preparation application needs to be associated with a particular tax entity. However, in some situations, tax data is obtained in which the owner of the tax data is not specified to the tax return system, or it would be more efficient to automatically determine the owner of the tax data and associate the tax data with a particular tax entity.

SUMMARY

Embodiments of the present invention are directed to methods, systems and articles of manufacture for associating tax data in a tax data item with a particular tax entity to which the tax data pertains (i.e., tax entity which owns the tax data). Determining and correctly maintaining the ownership relationship between tax data and the tax entity to which the tax data pertains is in a number of instances required in order to properly prepare and calculate a tax return. Tracking the ownership relationships may also be important in facilitating an interactive tax preparation experience in using a tax return software application by storing and using the tax topics relevant to a particular tax entity. For example, if a spouse entry is deleted as a tax entity in a particular tax return, then all the tax data belonging to the spouse can be collected and deleted, either automatically or after user confirmation.

Embodiments of the invention may be implemented on a computerized tax return system comprising one or more computers, including any electronic computing device (such as a computer system, personal computer, server computer (e.g. website server), mainframe computer, portable computer, tablet computer, smartphone, or the like) having a processor and memory, a communication interface, a database stored on a storage device, and a tax preparation software application running on the computing device. The computer may also include multiple computers operably linked together. The computerized tax return system can be a stand-alone system, such as a computer system, personal computing device (such as a personal computer, tablet computer, mobile phone, or smartphone), or it can be an online system that is accessible by a computing device (such as a computer system which may include multiple computers operably linked together, a personal computer, a tablet computer, a mobile phone, a smartphone, etc.) via a communication network such as the internet or proprietary network, or combination thereof. The computer(s) of the tax return system may also be connected through one or more communication networks, such as the internet via a website server and/or a private network, to communicate with users and/or sources of tax data and information. Thus, a user can utilize the tax return system, for example, by accessing a website, or through other suitable means, such as direct access to the computer(s) of the system, or through a private network, or even through a mobile communication device such as a mobile phone or smartphone.

While the present invention is directed to tax return preparation software systems and applications, the present invention includes only that part of a method, apparatus, technology, computer program product, or system that is used solely for assisting in preparing a tax or information return or other tax filing, including one that records, transmits, transfers, error checks or organizes data related to such filing. The present invention does not include any strategy for reducing, avoiding, or deferring tax liability.

Accordingly, one embodiment of the present invention is directed to a system for associating tax data in a tax data item with a particular tax entity to which the tax data pertains. The system comprises a tax return system as described above. The tax return system is configured to access a tax data item having tax data regarding a tax entity. The tax return system may access a tax data item by any suitable means, such as: a user typing in tax data from a tax data item into forms or in response to interview questions; electronically accessing a tax data item from financial service providers of a tax entity; electronically accessing tax related documents, such as prior year tax returns, tax forms (e.g., W-2s, 1099s-1099-B, 1099-DIV, 1099-INT, etc.); accessing scanned versions of tax related documents; receiving tax data items transferred from another database on the computer or remotely stored on a different computer or storage device/server; or by accessing any other suitable source of tax data items. As used herein, a "tax data item" means an electronic document or data file having tax data.

The tax return system is configured to store in the database a tax entity record for each of the tax entities related to the tax return being prepared. As an example, a tax return for a married couple with one dependent, the tax return system will include three tax entity records, one for each spouse and one for the dependent. Each tax entity record includes key attributes regarding the respective tax entity, which typically includes identification information such as first name, last name, social security number, identification code, etc.

The tax laws, rules, forms and tax calculations are broken down into various "tax topics," to organize and categorize tax data to be used in completing a tax return. Each tax topic is directed to a particular tax concept, tax form, or tax-related question, such as the various types of income (e.g., ordinary income, W-2 income, interest income, etc.), deductions (e.g., mortgage deduction, child-care, health care, dependents, etc.), tax credits, tax forms (1040, W-2, 1099s), tax schedules, etc. For instance, a federal tax return may have nearly one hundred tax topics, some or all of which need to be covered for completing a federal tax return.

For each tax topic in which the owner of the tax data is desired for preparing a tax return, the tax preparation software program has a set of matching rules for matching tax data from a tax data item to a tax entity. Each set of matching rules is configured to compare the tax data from a tax data item to the key attributes of the tax entity records for a respective tax topic.

The tax preparation software program further comprises a matching algorithm for utilizing the matching rules to compare the tax data from the tax data item to the key attributes of each of the tax entity records and to compute a matching score for each tax entity. As an example, the matching algorithm may analyze whether a data string of a first type (e.g., a first name) in the tax data matches a key attribute data string of the same first type in each of the tax entity records. Each of the matching rules may be configured to compare various data of the same type between the tax data and the key attributes in each of the tax entity records.

The tax return system is further configured to utilize the matching scores for each tax entity to determine a match between one of the tax entities and the tax data item, referred to as a "matching tax entity." For example, the tax return system may determine the tax entity having the matching score indicating the most likely match between one of the tax entities and the tax data item, such as a highest matching score.

Finally, the tax return system is configured to generate and store a data ownership record which associates the matching tax entity with the tax data from the tax data item. In this way, the tax return system can properly track the ownership of the tax data from the tax data item, and properly utilize the tax data in calculation the tax return.

In another aspect of the present invention, the tax return system is configured to generate a normalized data set for the tax data item. The normalized data set is optimized to exclude the tax data from the tax data item which are already included as a key attribute of the tax entity record for the tax entity. The normalized data set is associated with the tax entity, such as by the data ownership record. Therefore, the normalized data set does not need to include the tax data which is already included in the tax entity record for the matching tax entity.

In still another aspect, each set of matching rules comprises a plurality of matching rules regarding a respective tax topic. Each matching rule is configured to compare a respective key attribute field of a particular type for a tax entity with a field of the same type from the tax data item. For instance, a first matching rule for matching a first tax data item regarding a first tax concept to a tax entity is configured to compare a first key attribute field of a first type for a respective tax entity with a first field of the first type from the tax data item for the first tax topic. Similarly, a second matching rule for matching the first tax data item regarding the first tax concept to a tax entity is configured to compare a second key attribute field of a second type for a respective tax entity with a second field of the second type from the tax data item for the second tax topic.

In still another aspect of the system of the present invention, the tax return system is configured to determine a matching tax entity using a process having multiple options which account for various matching score results for the tax entities. When there is a single tax entity having a matching score indicating the most likely match between the tax entities and the tax data item, then the tax return system determines that such single tax entity is the matching tax entity. When there are more than one tax entity having a matching score indicating the most likely match between the tax entities and the tax data item, then the tax return system requests a user to identify a matching tax entity from a list of the tax entities having the best matching score. The system receives a selection of the matching tax entity from the user, and then determines that the selected matching tax entity is the matching tax entity. When none of the tax entities have at least a predetermined minimum matching score, then the tax return system performs at least one of the following: a) requesting a user to select a tax entity which matches the tax data item from the tax entities having the best matching score, receiving a selection of the selected tax entity from the user, and determining the selected tax entity to be the matching tax entity; or b) obtaining additional matching data from the tax data item and one or more additional key attribute field values, compare the additional matching data to the one or more additional key attribute field values using the matching algorithm and respective one or more additional matching rules and computing an additional matching score, combine the additional matching score with the matching score for each tax entity to determine an updated matching score, determine a tax entity having the updated matching score indicating the most likely match, and determining such tax entity to be the matching tax entity; or c) asking the user if the user wants to add a new tax entity which matches the tax data item, wherein the new tax entity does not already have a tax entity record in the database of tax entity records, and determining the new tax entity to be the matching tax entity.

In yet another aspect, the matching algorithm comprises a fuzzy comparison algorithm. A fuzzy comparison algorithm is an algorithm which can determine strings which approximately match.

In still another aspect of the system, the tax return system is also configured to determine a data type for the tax data in the tax data item and a tax topic to which the tax data item pertains. For example, a data type may include various types of data such as first name, last name, social security number, address, phone number, etc. Example of various tax topics are described above.

In still another aspect of the present invention, the tax return system is configured to analyze the tax data item by parsing the tax data contained in the tax data item and determining one or more data values in the tax data item, and determining a data type for each data value. The parsing may be accomplished by analyzing the strings of characters in the tax data item and determining the constituents of tax data in the tax data item. For instance, the constituents of tax data may be separated into boxes on a scanned form, or by commas or spaces in a data file. The tax return system can determine a data type for each data value by comparing the data values to known values for various data types, by identifying labels within the tax data item, or other suitable methods.

In yet another feature, the matching algorithm is configured to utilize the length of the data strings in determining a matching score such that the matching algorithm assigns a better matching score the longer the string that matches between two data values being compared.

Another embodiment of the present invention is directed to computer-implemented methods for associating tax data in a tax data item with a particular tax entity to which the tax data pertains. The method may be implemented on a tax return system, as described above, or any other suitable system. The tax return system electronically accesses a tax data item having tax data regarding a tax entity. The tax return system is configured to store in a database one or more tax entity records wherein each tax entity record includes key attributes regarding a respective tax entity.

For each tax entity, the tax return system identifies a respective first key attribute value of a first type from the respective tax entity record. In other words, for each tax entity for which the system has a tax entity record, the system identifies a first key attribute value of a first type. The "type" are the same data types as described above. For instance, the first type may be a first name of the tax entity, and key attribute value is the character string of the first name (e.g., "Michael"). Similarly, for each tax entity, the tax return system identifies a respective second key attribute value of a second type from the respective tax entity record. For instance, the second type may be a last name of the tax entity, and key attribute value is the character string of the last name (e.g., "Jordan"). The tax return system also identifies a first data value of a tax data item regarding a first tax topic, wherein the first data value is of the first type (e.g., first name). The tax return system identifies a second data value of the tax data item regarding the first tax topic, the second data value being of the second type (e.g., last name).

Then, for each tax entity, the tax return system compares the respective first key attribute value to the first data value and computes a first matching score for each tax entity using a matching algorithm and a first matching rule configured to compare a first key attribute field value of a tax entity and a first field value of a tax data item for the first tax concept. Likewise, for each tax entity, the system compares the respective second key attribute value to the second data value and computes a respective second matching score for each tax entity using the matching algorithm and a second matching rule configured to compare a second key attribute field value of a tax entity and a second field value of a tax data item for the first tax concept.

For each tax entity, the tax return system combines the first matching score and second matching score to obtain a respective composite matching score for each tax entity. The composite matching score may be a simple sum of the first matching score and second matching score, a weighted sum, or other suitable composite which takes into account both matching scores for each tax entity.

The tax return system determines a match between one of the tax entities and the tax data item using the composite matching scores, referred to as a "matching tax entity". For instance, the tax return system may determine the tax entity having the highest or best composite matching score indicating the most likely match. Finally, the system associates the matching tax entity with the tax data item by generating a match data record and storing the data ownership record in the database.

In additional aspects of the present invention, the computer-implemented method may also include any of the additional aspects described herein for the system for associating a tax data item with a tax entity which owns the tax data.

Another embodiment of the present invention is directed to an article of manufacture comprising a non-transitory computer readable medium embodying instructions executable by a computer to execute a process according to any of the method embodiments of the present invention for associating tax data in a tax data item with a particular tax entity to which the tax data pertains. For instance, the non-transitory computer readable medium embodying instructions executable by a computer may be configured to execute a process comprising: electronically accessing a tax data item having tax data regarding a tax entity; storing in a database one or more tax entity records wherein each tax entity record includes key attributes regarding a respective tax entity; for each tax entity, identifying a respective first key attribute value of a first type from the respective tax entity record; for each tax entity, identifying a respective second key attribute value of a second type from the respective tax entity record; identifying a first data value of a tax data item regarding a first tax concept, the first data value being of the first type; identifying a second data value of the tax data item regarding the first tax concept, the second data value being of the second type; for each tax entity, comparing the respective first key attribute value to the first data value and computing a first matching score for each tax entity using a matching algorithm and a first matching rule configured to compare a first key attribute field value of a tax entity and a first field value of a tax data item for the first tax concept; for each tax entity, comparing the respective second key attribute value to the second data value and computing a respective second matching score for each tax entity using the matching algorithm and a second matching rule configured to compare a second key attribute field value of a tax entity and a second field value of a tax data item for the first tax concept; for each tax entity, the tax return system combining the first matching score and second matching score to obtain a respective composite matching score for each tax entity; determining a match between one of the tax entities and the tax data item using the composite matching scores, referred to as a "matching tax entity"; and associating such tax entity with the tax data item by generating a match data record and storing the data ownership record in the database.

In additional aspects, the article of manufacture may be further configured according to the additional aspects described herein for the system and/or method for associating tax data in a tax data item with a particular tax entity to which the tax data pertains.

Accordingly, the tax return system, methods and articles of the present invention improve tax return preparation systems by allowing more efficient entry of tax data and reducing the amount of manual input required by a user. Tax data can be automatically accessed by the system and input to the system, such as by scanning documents and electronically accessing tax data items. The tax return system can then automatically associate the tax data with the proper tax entity (owner of the tax data), with no effort or little effort by a user. The tax return system also improves the operation of the computer utilized in the tax return system, including increasing the speed of preparing a tax return, and reducing the memory and/or data storage required to store and calculate a tax return.

It is understood that the steps of the methods and processes of the present invention are not required to be performed in the order as shown in the figures or as described, but can be performed in any order that accomplishes the intended purpose of the methods and processes.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant, wherein.

DETAILED DESCRIPTION OF ILLUSTRATED EMBODIMENTS

Figure 1:
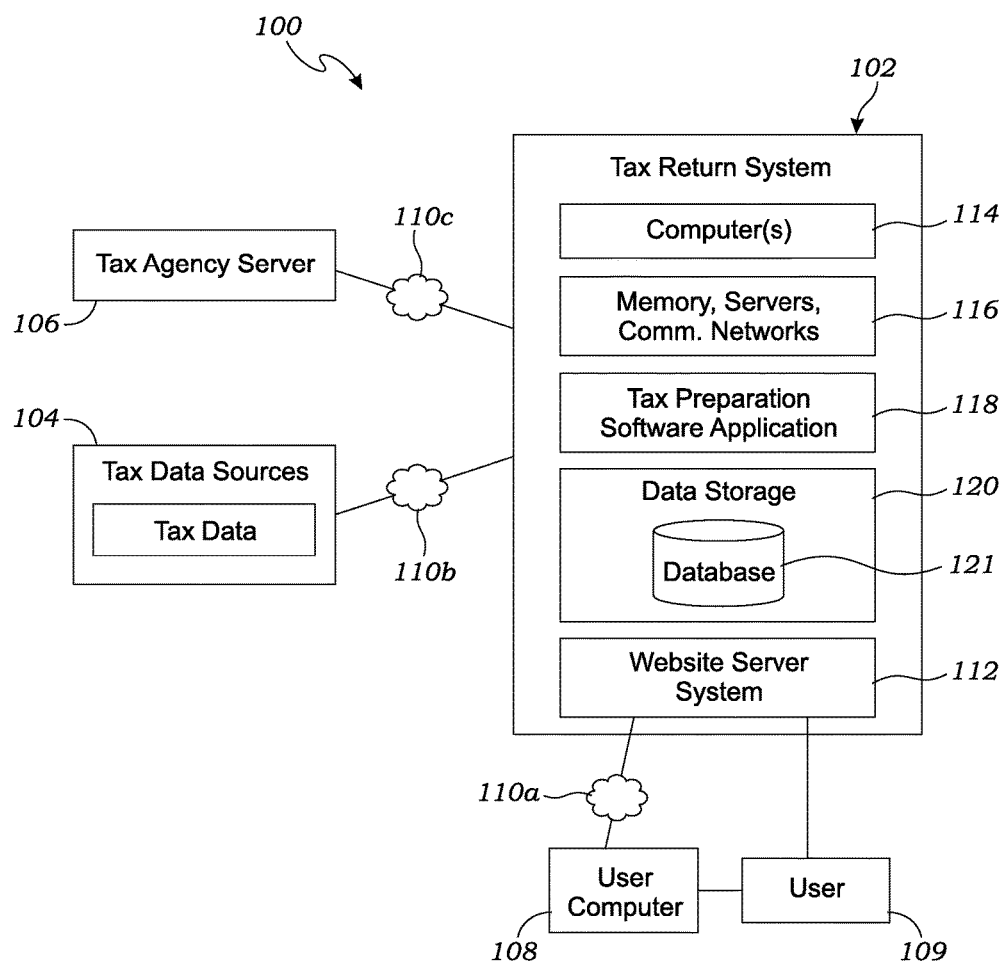
FIG. 1 illustrates an exemplary system for associating tax data in a tax data item with a particular tax entity, according to one embodiment of the present invention.

Embodiments of the present invention are directed to systems, methods and articles of manufacture for associating tax data in a tax data item with a particular tax entity to which the tax data pertains. In general, a computerized tax return system comprises a computer system having one or more computer(s) having at least one computer processor, memory, a database stored on a storage device, and a tax preparation software application running on the computer(s). The tax return system is configured to access a tax data item having tax data regarding a tax entity, such as an electronic version of a tax form. The tax return system is also configured to store in the database tax entity record(s) for one or more tax entities related to a tax return being prepared. The tax return system has a set of matching rules for matching tax data from the tax data item with key attributes of the tax entity record(s) for a respective tax topic. The tax return system also has a matching algorithm for utilizing the matching rules to compare the tax data from the tax data item to the key attributes from each of the tax entity records and to compute a matching score for each tax entity. The tax return system utilizes the matching scores for each tax entity to determine a matching tax entity which is the tax entity having the matching score indicating the most likely to match between the tax entities and the tax data item. The tax return system generates and stores a data ownership record which associates the matching tax entity with the tax data from the tax data item. The tax return system also generates a normalized data set for the tax data item which includes the relevant tax data from the tax data item, and excludes the tax data from the tax data item which is duplicative of data already included in the tax entity record for the tax entity.

As an example, a user can input a bunch of tax reporting statements such as W-2s, 1099s, etc., into the tax return system. A user can scan the paper forms received in the mail, and/or download the forms from online websites, and then upload the forms to the tax return system. At this point, the tax return system does not know who the forms are for, in other words, who owns the W-2. The system analyzes each of the forms and finds the tax data in each of the forms, which will typically include identifying information for the owner of the tax form. The tax return system then uses matching rules which tells the system what kinds of data to compare between the tax data in each of the forms and identifying information for the taxpayer and other persons listed on the tax return, such as a spouse, dependents or businesses, in order to determine who owns the tax form. The matching rules also give a score for each of matches depending on how reliable a match of the particular data is in determining the owner. The tax return system applies the matching rules for each kind of data for each of the people and computes matching scores for each person. The person with the best matching score for each tax form is determined to be the owner of that tax form. The system then generates and store a data record for each tax form which matches the tax form to the owner so that the system can user proper ownership record in calculating the tax return.

Referring to FIG. 1, in one embodiment of the present invention, a block diagram of a system 100 for associating tax data in a tax data item with a particular tax entity to which the tax data pertains is shown. The system 100 comprises a computerized tax return system 102 which is in electronic communication with various tax data sources 104, a tax agency server 106, and a user computer 108, via one or more communication networks 110a, 110b, and 110c. Each of the networks 110a, 110b and 110c may include a proprietary network, LAN, WAN, cellular network, wireless network, the internet and/or other suitable network. The tax return system 102 and/or website server system 112 may be operated by a tax preparation services provider, a third party service provider, a financial institution or by a third party host. One example of a third party host that provides website servers for providing online financial services for financial institutions and their customers is INTUIT FINANCIAL SERVICES™.

The tax return system 102 may be an online system which is accessed by a user's computer 108 via a communication network 110a, such as the internet, or it may be a local system which runs on a user computer 108 of a user 109. The block diagram of FIG. 1 illustrates an online tax return system 102 having a website server system 112 hosting a website for an online tax preparation application which is accessed by the user computer 108 over the communication network 110a, typically the internet, although it could be any suitable network, as described above.

The tax return system 102 comprises: one or more computer(s) 114; peripheral hardware 116 such as memory, servers, communication networks, etc.; a tax preparation software application 118 executable by the computer(s); a website server system 112; and a data storage 120 having a database 121 for reading and writing tax data for preparing a tax return for a taxpayer. The computer 114 may be any suitable computing device, including a mainframe computer, a personal computer (including a desktop computer, laptop computer or tablet computer), a server computer, a smartphone, or other suitable computing device. In the case of a local system, the computer 114 may be a personal computer, such as a desktop computer, laptop computer or tablet computer, a handheld computing device, a smartphone, a mobile phone capable of running applications, or other suitable computing device.

Figure 2:
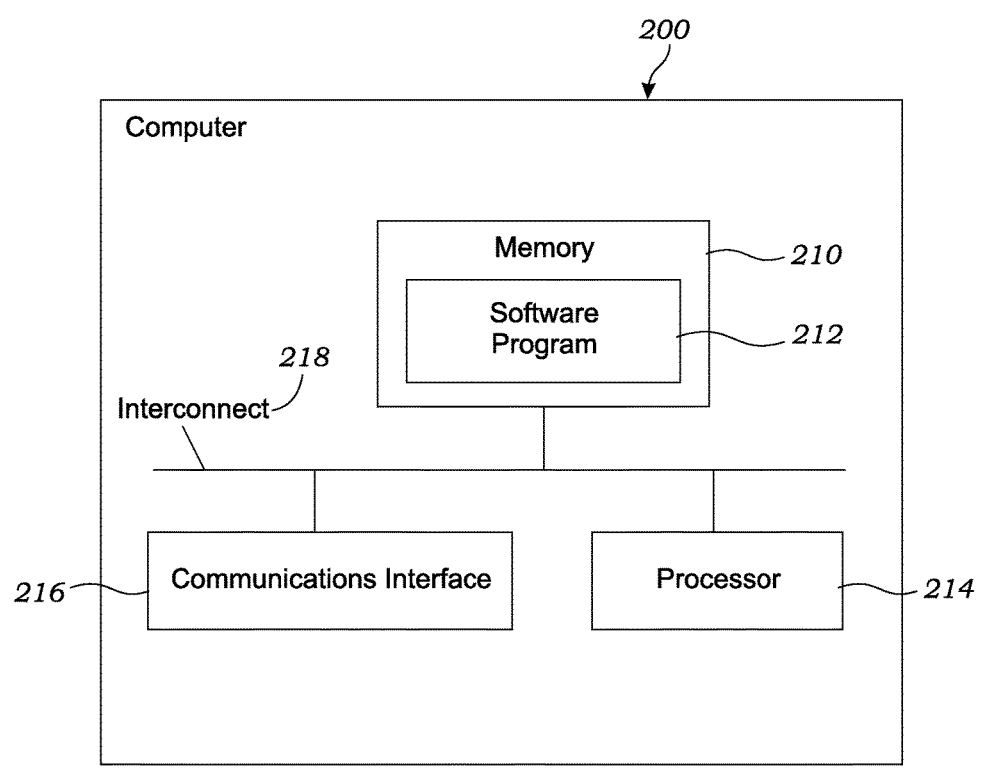
FIG. 2 is a block diagram of a computing device (computer) which may be utilized in the system of FIG. 1.

FIG. 2 generally shows a block diagram of the components of an example of a computer (computing device) 200 that may be used as the computer in the computers and servers identified in the system 100 of FIG. 1, such as the computer(s) 104, servers 116 and website server system 112 of the tax return system 102, and the user computer 108. The computer 200 includes a memory 210, an application software program 212, a processor or controller 214 to execute the application software 212, a network or communications interface 216, e.g., for communications with a network or interconnect 218 between the components. The memory 210 may be or include one or more of cache, RAM, ROM, SRAM, DRAM, RDRAM, EEPROM, SDRAM and other types of volatile or non-volatile memory capable of storing data. The processor unit 214 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 218 may include a system bus, LDT, PCI, ISA, or other types of buses, and the communications or network interface may, for example, be an Ethernet interface, a Frame Relay interface, or other interface. The network interface 216 may be configured to enable a system component to communicate with other system components across a network which may be a wireless network or various other communication networks. It should be noted that one or more components of computer 200 may be located remotely and accessed via a network. Accordingly, the system configuration provided in FIG. 2 is provided to generally illustrate how embodiments may be configured and implemented.

The tax return system 102 may be in communication with one or more sources of taxpayer tax data 104 through a communication network 110b. The tax data sources 104 may include financial services providers (such as banks, credit unions, brokerages, investment advisors) at which the taxpayer has financial accounts, tax preparation services utilized by the taxpayer, credit reporting bureaus, government databases, etc.

The tax return system 102 may also be in communication with a tax agency server 106 for electronically receiving completed electronic tax returns, such as the Internal Revenue service, a state tax authority, or other tax collecting entity, through the communication network 110c. Thus, the tax return system 102 may function as an electronic filing server such that the tax return system 102 can electronically file a completed tax return. The tax return system 102 may also be configured to request extensions of time, make electronic tax payments, and/or execute other tax related transactions.

In the case of an online system, the tax return system 102 also comprises a website server system 112 which enables a website for users 109 using a user computer 108 to access and use the tax return system 102. The website server system 112 comprises one or more computers, servers and website servers, as well as software programming and web pages for providing a website. The website server system 112 may be part of an online financial services system which provides a multitude of online services to clients or tax preparation services system for providing tax preparation services, or it may be a standalone/dedicated system for providing tax preparation and filing services. The website server system 112 is in communication with a communication network 110c, such as the internet, so that the website is accessible over the internet, such as through the use of a web browser on a user's computer or a dedication application (app) on a user's computer.

In the case of a local system, such as an application or software program running on the user computer (e.g., an "app" running on a smartphone or tablet computer), the block diagram of FIG. 1 would be simply modified by making the user computer the tax return preparation system 102, in which case the tax return preparation system 102 would not require the website server system 112. The user 109 downloads the tax preparation software application 118 onto the user computer 108, and if necessary, installs the application on the computer. Then, the user 109 simply runs the tax preparation application 118 on the computer, and the computer associates tax data in a tax data item with a tax entity, as described herein, and may also prepare and file a completed tax return. The user computer 108 is in communication with sources of tax data 104 and a tax agency server 106 via communication networks 110b and 110c, similar to the tax return system 102 as described herein.

The tax return system 102 is configured to store in the database 121 a tax entity record for each of the tax entities related to a particular tax return being prepared by the tax return system 102. Each tax entity record includes key attributes regarding the respective tax entity, including personal identifying information such as first name, last name, social security number, identification code, and/or other personal information. While the tax return system 102 is configured to store tax entity records, at any particular time in preparing an electronic tax return, the tax return system 102 may or may not currently have any tax entity records stored for a particular tax return. For example, at the commencement of preparing a tax return, the tax return system 102, no tax entity may yet have been identified for the tax return. In such case, the tax return system 102 may generate tax entity records as it receives tax data sufficient to identify a tax entity and to generate a tax entity record.

Figure 3:
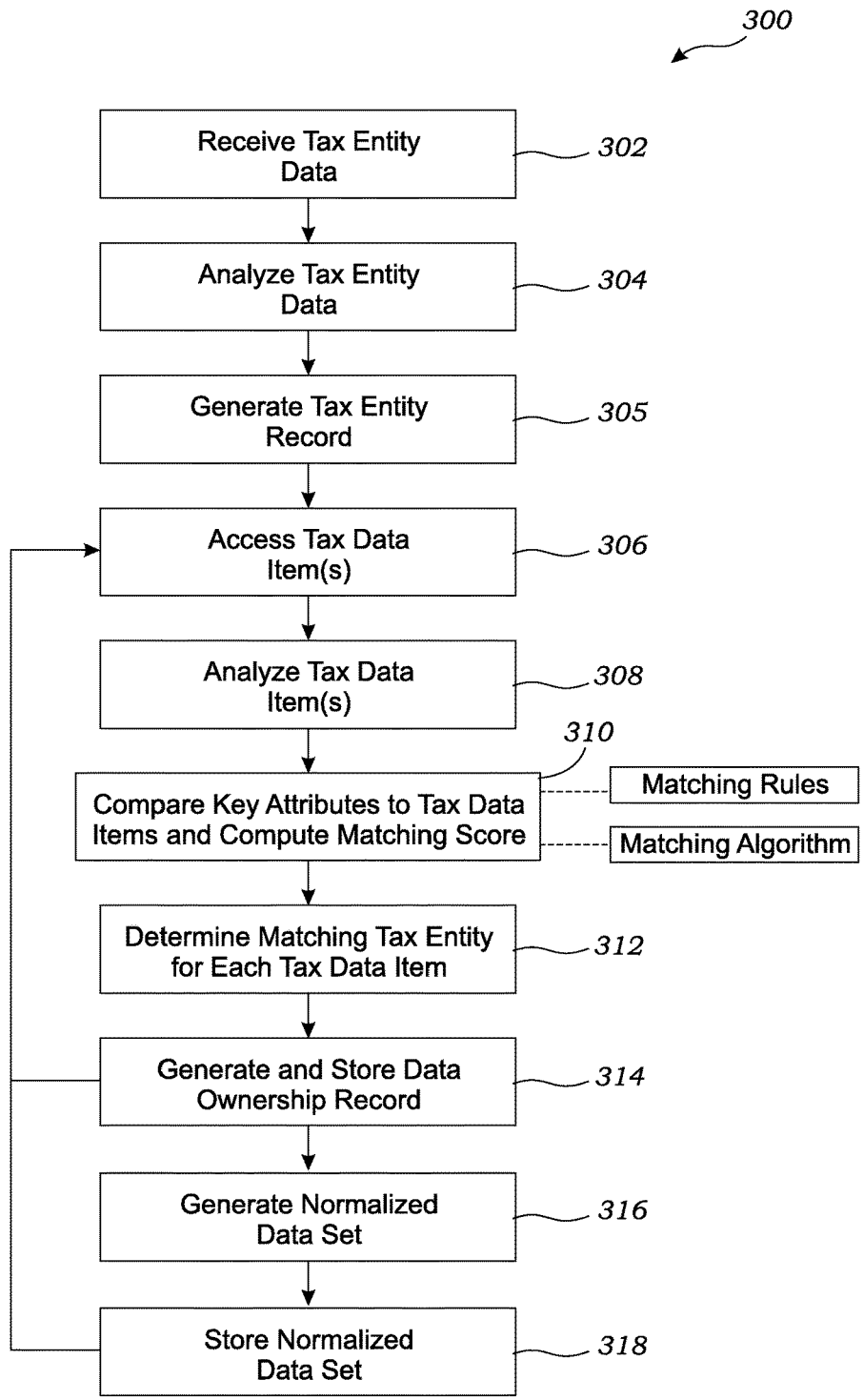
FIG. 3 is a flow chart of a computer-implemented method for associating tax data in a tax data item with a particular tax entity, according to one embodiment of the present invention.

Whether an online system or a local system, the tax return system 102 is configured to execute the tax preparation application 118 to perform a computer-implemented method for associated tax data in a tax data item with a tax entity to which the tax data pertains. Referring to FIG. 3, in one embodiment, a computer implemented method 300 for associating tax data in a tax data item to a tax entity using the tax return system 102 is shown. At step 302, the tax return system 102 may receive tax entity data, which may be accessed any suitable method. For instance, the system 102 may request tax entity data from a user 109 and user may input the tax entity data, for example, using an interview screen or fillable table presented to the user 109 by the system 102. The tax return system 102 may access tax entity data by any of the methods described below for accessing tax data items, such as electronically accessing tax related documents and tax forms from tax data sources 104, accessing scanned versions of tax related documents, such as a user 109 scanning a tax reporting form and uploading it to the system 102, etc. Indeed, the tax entity data may be a tax data item, as many tax data items include most or all of the data needed to identify a tax entity and to generate a tax entity record.

At step 304, the tax return system 102 analyzes the tax entity data and determines key attributes (also referred to as "key attribute values") from the tax entity data to be used in generating the tax entity record. The tax return system also determines a data type for each of the key attributes, such as whether the key attribute is a first name, last name, social security number, address, phone number, etc.

At step 305 the tax return system 102 generates a tax entity record which includes the key attributes for the tax entity regarding the tax entity data. The tax return system 102 can access tax entity data 104 and generate a tax entity record during any part of the method 300, and the steps 302-305 are not required to be performed in the particular part of the method 300 as shown in FIG. 3.

At step 306, the tax return system 102 accesses one or more tax data items having tax data regarding a tax entity which is relevant to the tax return being prepared. The tax return system 102 may access tax data items by any suitable method. As an example, electronic tax forms may be uploaded to the tax return system 102, such as scanned tax reporting forms or electronic versions of tax reporting forms. This would allow a tax preparer (e.g., a taxpayer or tax preparation service) to simply upload all available tax reporting forms, and then allow the system 102 to process them, as described below. The tax return system 102 may also present to the user 109 a series of interview screens or fillable forms to which the user responds by entering appropriate tax data items. The tax return system 102 may also obtain tax data items by electronically accessing them directly from tax data sources 104 via the communication network 110b. For instance, the user may give the tax preparation system 102 permission, and/or usernames and passwords, if necessary, to access tax data items from financial services providers (such as banks, credit unions, brokerages, investment advisors) at which the taxpayer has financial accounts, or tax data items from tax preparation services, or tax data items from credit reporting bureaus, or data from government databases, etc.

At step 308, the tax return system 102 analyzes and/or parses the tax data items to extract tax data in the tax data items, including tax data values within the tax data items. The tax return system 102 also determines a data type for each data value, similar to determining data types for the data types for the key attributes, as described above. The system 102 may parse the tax data in the tax data items by analyzing the strings of characters in each tax data item and determining the constituents of tax data, including the tax data values and data types for each tax data value. The parsing may distinguish the constituents by separation in boxes on a form, or by commas, spaces or other delineators in a data file. The data type for a data entry categorizes the type of data for the data entry, such as whether the data entry is a, first name, last name, address, city, zip code, phone number, email address, etc. The system 102 may analyze headings or labels within the tax data item to determine the data type for each of the data entries listed just below the headings. For example, the system 102 may analyze the heading "FIRST NAME" to determine that the data listed just below it has a data type that is a first name. The system 102 may also analyze the format of a data entry to determine its data type, such as by parsing the data entry and/or using a Regex/pattern matching algorithm. For example, a social security number has 9 digits (123-45-6789), a zip code has 5 digits, a phone number typically has 10 digits separated by a character such as dashes (123-456-7890) or periods, and so on for each data type. If the tax return system 102 is unable to definitively determine the data type of a tax data value, it may query the user to select the data type, such as by showing the tax data value and/or the tax data item and giving the user a menu of data types to select for the tax data value. The tax return system 102 may be configured to utilize multiple methods for determining the data type of each tax data value, such as using two or more of the methods described above, i.e. analyzing headers, analyzing formats, and allowing a user to select a data type.

At step 310, for each tax entity, the tax return system 102 compares a set of the key attribute values for a respective tax entity to a set of data values for a tax data item and computes a matching score using a matching algorithm and a set of matching rules designed for the tax topic of the particular tax data item being processed. As explained above, the tax laws, rules, forms and tax calculations are broken down into various "tax topics." Each tax topic is directed to a particular tax concept, tax form, or tax-related question, such as the various types of income (e.g., ordinary income, W-2 income, interest income, etc.), deductions (e.g., mortgage deduction, child-care, health care, dependents, etc.), tax credits, tax forms (1040, W-2, 1099s), tax schedules, etc.

The tax return system 102 has a set of matching rules for each tax topic which may require associating tax data related to the tax topic to a particular tax entity. For example, W-2 tax data, dependents, health care expenses, and more, may require knowing the owner of such tax data in order to properly prepare and calculate a tax return. Tracking the ownership relationships may also be important in facilitating an interactive tax preparation experience in using the tax return software application 118 by storing and using the tax topics relevant to a particular tax entity. For example, if a spouse entry is deleted as a tax entity in a particular tax return, then all the tax data belonging to the spouse can be collected and deleted, either automatically or after user confirmation.

Thus, the tax return system 102 comprises a plurality of sets of matching rules. Each set of matching rules is configured to compare the tax data from a tax data item to the key attributes of the tax entity records for a particular tax topic. Typically, a respective set of matching rules includes a plurality of matching rules in which each rule compares a tax data value from a tax data item of a particular data type to a key attribute value of a tax entity record of the same data type, and each of the different matching rules within a set is configured for a different data type. Each of the matching rules in a set of matching rules may also include a matching weight to reflect the relative importance or reliability of a particular rule in determining a match and which can be used in computing a matching score using a matching algorithm as described below. Each set of matching rules may have any suitable number of matching rules, such as one matching rule, two matching rules, three matching rules, four matching rules, five matching rules, or more.

The matching algorithm is configured to utilize the matching rules to determine a matching score. The matching algorithm compares the data string of the tax data value of a particular type to a key attribute value of the same type for a tax entity to determine whether there is a match. The matching algorithm repeats this process for each of the matching rules in a set of matching rules for a particular tax topic. The matching algorithm may be configured to identify exact matches and/or approximate matches, such as by using a fuzzy comparison algorithm. The matching algorithm may also be configured to utilize the length of continuous matching characters within a data string and/or the number of non-continuous matching characters within a data string in determining a matching score such that the matching algorithm assigns a better matching score the longer the continuous character matching and/or the more matching characters between two data values being compared.

The matching algorithm also takes into account the matching weights for each of the matching rules in computing a matching score, and combines the matching score for each matching rule to compute a matching score for the set of matching rules (also referred to as a composite matching score). The matching algorithm may determine a composite matching score as a simple sum of the matching scores within a set of matching rules, a weighted sum, or other suitable combination which takes into account each of the matching scores within a set of matching rules.

An example of a matching algorithm and a matching rule for matching a tax data item comprising a W-2 income reporting form with a tax entity will now be described. First, the matching rule may include a set of models that each define a collection of data types as potential matching attributes. For the key attributes of a tax entity, the data types may be include the first name, last name and social security number, while for the W-2 data types also include the first name, last name and social security number. These models may be expressed as:

W-2:[employee_first_name, employee_last_name, employee_SSN]

Tax Entity: [first_name, last_name, SSN]

Then, a set of three matching rules are designed to compare the tax data values of the W-2 the tax data item) for each of the three data types to the key attribute values of a tax entity for the same respective data types. In this example, the first name and last name matching rules have a weight index of 10 and the social security number has a weight index of 20. These rules can be expressed as:

Rule 1: W2.employee_first_name==Person.first_name (weight: 10)

Rule 2: W2.employee_last_name==Person.last_name (weight: 10)

Rule 3: W2.employee_ssn==Person.SSN (weight: 20)

The matching algorithm computes a matching scores for each data type, i.e., each potential matching pair. For each match determined by the matching algorithm using Rules 1, 2 and 3, the respective weight for such rule is computed and summed to compute a matching score. Continuing the example above, consider two tax entities having respective tax entity records having key attributes values as follows:

p1={first_name=>'John', last_name=>'Smith', SSN='123-45-6789'} p2={first_name=>'Jane', last_name=>'Smith', SSN='555-55-5555'}

And two W-2 s having tax data values as follows:

w2_1={employee_first_name=>'John', employee_last_name=>'Smith', employee_SSN='123-45-6789'} w2_1={employee_first_name=>'Jane', employee_last_name=>'Smith', employee_SSN='555-55-5555'}

Using the matching rules and matching algorithm defined above, the matching algorithm computes the matching scores as follows:

p1_w2_1=40
p1_w2_2=10
p2_w2_1=10
p2_w2_2=40

At step 312, the tax return system 102 determines a match between each of the tax data items and a respective one of the tax entities using the matching scores. This step 312 may be a part of the matching algorithm or it may be a separate algorithm. The tax return system 102 analyzes the matching scores and determines which of the tax entities is the most likely match with the each respective tax data item, referred to as a "matching tax entity." For instance, the tax return system 102 may simply determine which tax entity has the highest (or best, depending on the type of scoring system) matching score indicating the mostly likely match with each respective tax data item.

At step 314, the tax return system 102 generates and stores a data ownership record which associates the matching tax entity with the tax data from the tax data item to which it was matched at step 312. The data ownership record may be stored in the database 121 of the data storage 120 or on any other suitable data storage device accessible by the tax return system 102. The data ownership record may be configured as a triple in the format of [subject] [verb] [object], where the subject represents the matching tax entity, the verb is a pre-defined label specifying an association (i.e., ownership), and the object is the respective tax data record having for tax data item being associated with the matching entity. For example, [p1] [Owns] [w2_1] means the tax data record identified by w2_1 is associated with (i.e., owned by) the tax entity identified with p1.

Steps 306-314 may be repeated for additional tax data items accessed by the tax return system 102, until the tax return is completed.

At step 316, the tax return system 102 generates a normalized data set for each of the tax data items. The normalized data set for a tax data item optimized to include only the tax data from the tax data item required for preparing the tax return, and excludes the tax data from the tax data item which is already included as key attribute(s) of the tax entity record for the matching tax entity. The system 102 may first generate a de-normalized data set for a tax data item which includes all of the tax data from the tax data item, including tax data which is duplicative of the data included as key attributes(s) of the tax entity record. Then, the system 102 transforms the de-normalized data set to a normalized data set. The transformation may be accomplished using an intelligent foreign key and/or interaction with the user 109. At step 318, the system 102 stores the normalized data set as a normalized data set record in the database 121. For example, a tax data item such as a W-2 form may include a first name, last name, and social security number, as well as employer information (e.g., tax ID), income data, withholding tax data and other tax data. The de-normalized data set for such tax data item includes the first name, last name, social security number, income data, employer information, income data, withholding tax data and other tax data. The normalized data set excludes the first name, last name, and social security number because this data is already included in the tax entity record for a matching tax entity.

Steps 306-318 may be repeated for additional tax data items accessed by the tax return system 102, until the tax return is completed.

Figure 4:
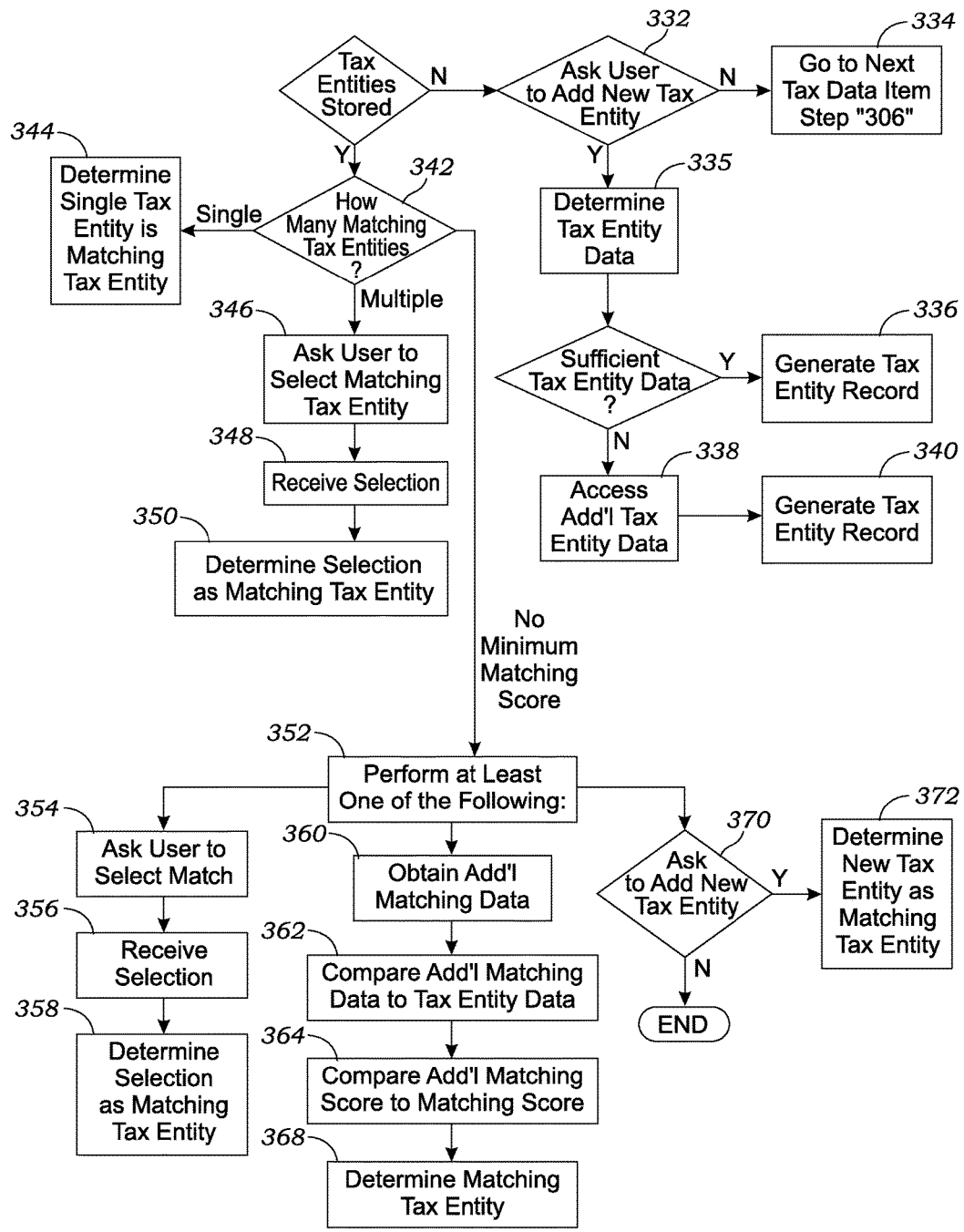
FIG. 4 is a flow chart of a method for performing step 312 of the method shown in the flow chart in FIG. 3, according to one embodiment of the present invention.

Turning now to FIG. 4, a method 330 is shown for determining a matching tax entity using a process having multiple options to account for various matching score results and also to add a tax entity not already in the database 121 based on a tax data item. In other words, the step 312 described above for determining a matching tax entity may comprise the method 330. At step 332, if there are no tax entities and no tax entity records yet entered in the system 102, then the system 102 ask the user 109 if the user 109 wants to add a new tax entity which matches the tax data item. At step 334, if the user 109 answers negatively, then the process ends and the system moves on to the next tax data item. At step 335, if the user answers affirmatively, then the system 102 determines tax entity data from the tax data item (using any of the processes described above for analyzing and parsing a data item). At step 336, if there is sufficient tax entity data generate a tax entity record, the system generates a new tax entity record using the tax entity data from the tax data item. At step 338, if there is insufficient tax entity data in the tax data item to generate a tax entity record, the system 102 may access additional data from any of the data sources 104 to obtain the tax entity data needed to generate a tax entity record and/or ask the user 109 to provide the tax entity data needed to generate a tax entity record, and then at step 340, the system 102 generates a new tax entity record. At step 340, the system 102 determines the new tax entity to be the matching tax entity.

If there is one or more tax entity records already in the system 102, then at step 342, the tax return system 102 determines how many tax entities having a matching score indicating a most likely match between the tax entities and the tax data item being analyzed. The tax return system 102 may make this determination by identifying the tax entity or tax entities with the best matching score, or the tax entity with the best matching score and any other tax entities having a matching score within a predetermined range of the best matching score. In this way, if multiple matching scores are very close to the best matching score, the system 102 can make a further determination as to which is the correct tax entity to match with the tax data item. The system 102 may also require the tax entity or tax entities having a matching score indicating a most likely match have at least a minimum matching score. This prevents the system 102 from determining a tax entity to be a matching tax entity where the matching score happens to be the best matching score but it is still a low matching score such that there is not a high reliability that the tax entity actually owns the tax data item.

At step 344, when only a single tax entity is determined to have a matching scored indicating the most likely match between the tax entities and the tax data item, then the tax return system 102 determines that such single tax entity is the matching tax entity. The system 102 may ask the user 109 to confirm the matching tax entity, or the system 102 may automatically determine the single tax entity and may also allow the user to change it if the user desires.

At step 346, when there are more than one tax entity having a matching score indicating the most likely match between the tax entities and the tax data item, then the tax return system 102 requests a user 109 to identify a matching tax entity from a list of the tax entities having the best matching score. At step 348, the system 102 receives a selection of the matching tax entity from the user 109, and then at step 350 the system 102 determines that the selected matching tax entity is the matching tax entity.

At step 352, when none of the tax entities have at least a predetermined minimum matching score, then the tax return system 102 performs at least one of the following: a) at step 354, the system 102 requests a user to select a tax entity which matches the tax data item from the tax entities having the best matching score, at step 356, the system 102 receives a selection of the selected tax entity from the user, and then at step 358, the system 102 determines the selected tax entity to be the matching tax entity; or b) at step 360, the system 102 obtains additional matching data from the tax data item and one or more additional key attribute field values, at step 362, the system compares the additional matching data to the one or more additional key attribute field values using the matching algorithm and respective one or more additional matching rules and computes an additional matching score, at step 364, the system 102 combines the additional matching score with the matching score for each tax entity to determine an updated matching score, at step 366, the system 102 determines a tax entity having the updated matching score indicating the most likely match, and at step 368, the system determines such tax entity to be the matching tax entity; or c) at step 370, the system 102 asks the user if the user wants to add a new tax entity which matches the tax data item, wherein the new tax entity does not already have a tax entity record in the database of tax entity records, at step 372, if the user answer affirmatively, the system 102 determines the new tax entity (tax entity data for the new tax entity may be determined using steps 302-305, as described above) to be the matching tax entity, and if the user answers negatively, the system 102 ends the process.

The methods 300 and 330 shown in FIGS. 3 and 4, as well as other method embodiments described herein, may also be embodied in, or readable from, a computer-readable medium (computer program carrier), e.g., one or more of the fixed and/or removable data storage data devices and/or data communications devices connected to a computer, including a non-transitory computer medium having instructions that when executed by a computer perform any of the described methods. The computer program carrier is readable by a computer and embodies instructions executable by the computer to perform the method steps of programming a computer to perform the methods 300 and 330, or any other method embodiments described herein. Carriers may be, for example, magnetic storage medium, optical storage medium and magneto-optical storage medium. Examples of carriers include, but are not limited to, a floppy diskette, a memory stick or a flash drive, a hard drive, CD-R, CD-RW, CD-ROM, DVD-R, and DVD-RW.

Accordingly, the system 100, tax return system 102, and the methods and articles of manufacture of the present invention improve tax return preparation systems by allowing more efficient and accurate entry of tax data and reducing the amount of manual input required by a user. One of the main sources of errors in preparing tax return, both paper and electronic, is errors in manual data entry. The manual entry of tax data is also one of the most labor intensive and time consuming task in preparing a tax return.

Using the system and methods of the present invention, tax data can be automatically accessed by the system and input to the system in bulk, such as by scanning documents and electronically accessing tax data items. This documents driven process is new and innovative. In fact, the disclosed embodiments allow a tax return to be substantially or even completely finished by simply inputting all of the taxpayer's tax documents and allowing the system to automatically determine the tax entities, the pertinent tax data and also automatically associate the tax data with the proper tax entity (owner of the tax data), with minimal effort by a user. The result is a faster, more accurate, less labor intensive and more efficient process for preparing a tax return.

The tax return system 102 also improves the operation of the computer 114 utilized in the tax return system 102, including increasing the speed of preparing a tax return, and reducing the memory and/or amount of data storage required to store and calculate a tax return. For instance, the normalized data record takes up less memory and data storage because it is optimized to include only the required data, allowing the computer to operate more efficiently. This efficiency is compounded when thousands, or even millions of tax returns are being prepared by the tax return system.

The disclosed method and system for associating tax data in a tax data item with a tax entity does not encompass, embody, or preclude other forms of innovation in the area of tax return preparation or processing. In addition, the disclosed method and system for associating tax data in a tax data item with a tax entity is not related to any fundamental economic practice, fundamental data processing practice, mental steps, or pen and paper based solutions, and is, in fact, directed to analyzing tax data in tax data items and comparing tax data in each tax data item to key attributes of tax entities using a matching algorithm and the matching rules to compute a matching score, and then generating optimized matching data records and normalized tax data records which improve the functioning of tax return system and the computers upon which they operate.

In addition, the disclosed systems and methods for associating tax data in a tax data item with a tax entity provide significant improvements to the technical fields of electronic tax return preparation, assembling of electronic tax data, and storage and processing of tax data, as well as improving the overall user experience in preparing electronic tax returns.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A computerized system, comprising:
   a computerized tax return preparation application comprising programmed instructions stored in a memory of a computer utilized by a user of the computerized tax return preparation application and executable by a processor of the computer to generate an electronic tax return and being configured to electronically access a tax data item regarding a tax entity, the tax data item having tax data regarding the tax entity;
   the computer, by the computerized tax return preparation application, configured to store in a database one or more tax entity records, wherein each tax entity record includes key attributes regarding the respective tax entity;
   the computerized tax return preparation application comprising a plurality of sets of matching rules for matching the tax data from a tax data item to a tax entity in the list of tax entity records, wherein each set of matching rules is configured to compare the tax data from the tax data item to the key attributes of the tax entity records for a respective tax topic;
   the tax return preparation application comprising having a matching algorithm configured to utilize the matching rules to compare the tax data from the tax data item to the key attributes of each of the tax entity records and to compute a matching score for each tax entity;
   the computer, by the computerized tax return preparation application, being configured to determine a matching tax entity utilizing matching scores for each tax entity to determine a match between one of the tax entities and the tax data item, wherein the computerized tax return preparation application is configured to determine the matching tax entity by executing the following process:
      when there is a single tax entity having a matching score indicating the most likely match between a tax entity and the tax data item, then determining such tax entity to be the matching tax entity;
      when there are more than one tax entity having a matching score indicating the most likely match between the tax entities and the tax data item, then requesting a user to identify a matching tax entity from the tax entities having the best matching score, receiving a selection of the matching tax entity from the user, and determining the selected matching tax entity to be the matching tax entity;
      when none of the tax entities have at least a predetermined minimum matching score, then the tax return system performing at least one of the following:
         a) requesting a user to select a tax entity which matches the tax data item from the tax entities having the best matching score, receiving a selection of the selected tax entity from the user, and determining the selected tax entity to be the matching tax entity; or
         b) obtaining additional matching data from the tax data item and one or more additional key attribute field values, comparing the additional matching data to the one or more additional key attribute field values using the matching algorithm and respective one or more additional matching rules and computing an additional matching score, combining the additional matching score with the matching score for each tax entity to determine an updated matching score, determining a tax entity having the revised matching score indicating the most likely match, and determining such tax entity to be the matching tax entity; or
         c) asking the user if the user wants to add a new tax entity which matches the tax data item, wherein the new tax entity does not already have a tax entity record in the database of tax entity records, and determining the new tax entity to be the matching tax entity; and
   the computer, by the computerized tax return preparation application, being configured to generate a data ownership record which associates the matching tax entity with the tax data from the tax data item and store the data ownership record to the database.

2. The system of claim 1, wherein the computer, by the computerized tax return preparation application, is configured to generate a normalized data set for the tax data item in which the normalized data set is associated with the tax entity and the normalized data set is optimized to exclude the tax data from the tax data item which are included as a key attribute of the tax entity record for the tax entity.

3. The system of claim 1, wherein the set of matching rules comprises:
 a first matching rule for matching a first tax data item regarding a first tax topic to a tax entity, the first matching rule configured to compare a first key attribute field of the tax entity and a first field of a tax data item for the first tax topic; and
 a second matching rule for matching the first tax data item regarding the first tax topic to a tax entity, the second matching rule configured to compare a second key attribute field of the tax entity data record for the first tax topic.

4. The system of claim 1, wherein the matching algorithm comprises a fuzzy comparison algorithm.

5. The system of claim 1, wherein the computer, by the computerized tax return preparation application, is configured to determine a data type for the tax data in the tax data item and a tax topic to which the tax data item pertains.

6. The system of claim 1, wherein the computer, by the computerized tax return preparation application, is configured to analyze the tax data item by parsing the tax data contained in the tax data item and determining one or more data values in the tax data item, and classifying each data value as being of a particular type of data.

7. The system of claim 1, wherein the matching algorithm is configured to utilize the length of the data strings in determining a matching score such that the matching algorithm assigns a better matching score the longer the string that matches between two data values being compared.

8. The method of claim 1, accessing the tax data item comprising the computer, by the computerized tax return preparation application, establishing a connection through a communication network with a tax data source and electronically accessing the tax data item stored in the tax data source.

9. The method of claim 1, accessing the tax data item comprising the computer, by the computerized tax return preparation application, presenting an interview screen or fillable form to the user through a display of the computer and receiving a user response through the interview screen or fillable form, the user response comprising the tax data item.

10. A computer-implemented method, comprising:
 a computerized tax return preparation application comprising programmed instructions stored in a memory of a computer and executed by a processor of a computer utilized by a user of the computerized tax return and operable to generate an electronic tax return, electronically accessing a tax data item having tax data regarding a tax entity storing one or more tax entity records in a database, wherein each tax entity record includes key attributes regarding a respective tax entity;
 the computer, by the computerized tax return preparation application, identifying, for each tax entity, a respective first key attribute value of a first type from the respective tax entity record;
 the computer, by the computerized tax return preparation application, identifying, for each tax entity, a respective second key attribute value of a second type from the respective tax entity record;
 the computer, by the computerized tax return preparation application, identifying a first data value of a tax data item regarding a first tax topic, the first data value being of the first type;
 the computer, by the computerized tax return preparation application, identifying a second data value of the tax data item regarding the first tax topic, the second data value being of the second type;
 the computer, by the computerized tax return preparation application, comparing, for each tax entity, the respective first key attribute value to the first data value and computing a first matching score for each tax entity using a matching algorithm and a first matching rule that compares a first key attribute field value of a tax entity and a first field value of a tax data item for the first tax topic;
 the computer, by the computerized tax return preparation application, comparing, for each tax entity, the respective second key attribute value to the second data value and computing a respective second matching score for each tax entity using the matching algorithm and a second matching rule configured to compare a second key attribute field value of a tax entity and a second field value of a tax data item for the first tax topic;
 the computer, by the computerized tax return preparation application, combining, for each tax entity, the first matching score and second matching score to obtain a respective composite matching score for each tax entity;
 the computer, by the computerized tax return preparation application, determining a matching tax entity comprising a match between one of the tax entities and the tax data item using the composite matching scores, wherein determining a match between one of the tax entities and the tax data item, comprises:
  when there is a single tax entity having a composite matching score indicating the most likely match between a tax entity and the tax data item, then the computer, by the computerized tax return preparation application, determining such tax entity to be the matching tax entity;
  when there are more than one tax entity having a composite matching score indicating the most likely match between the tax entities and the tax data item, then the computer, by the computerized tax return preparation application, requesting a user to identify a matching tax entity from the tax entities having the best composite matching score, receiving a selection of the matching tax entity from the user, and the computer, by the computerized tax return preparation application, determining the selected matching tax entity to be the matching tax entity;
  when none of the tax entities have at least a predetermined minimum matching score, then the computer, by the computerized tax return preparation application, performing at least one of the following:
   a) requesting a user to select a tax entity which matches the tax data item from the tax entities having the best composite matching score, receiving a selection of the selected tax entity from the user, and determining the selected tax entity to be the matching tax entity; or b) obtaining additional matching data from the tax data item and one or more additional key attribute field values, comparing the additional matching data to the one or more additional key attribute field values using the matching algorithm and respective one or more additional matching rules and computing an additional matching score, combining the additional matching score with the composite matching score for each tax entity to determine an updated composite matching score, determining a tax entity having the revised composite matching score indicating the most likely match, and determining such tax entity to be the matching tax entity; or c) asking the user if the user wants to add a new tax entity which matches the tax data item, wherein the new tax entity does not already have a tax entity record in the database of tax entity records, and determining the new tax entity to be the matching tax entity; and associating such tax entity with the tax data item by generating a match data record and storing the data ownership record in the database.

11. The method of claim 10, further comprising: the computer, by the computerized tax return preparation application, generating a normalized data set for the tax data item in which the normalized data set is associated with the tax entity and the normalized data set is optimized to exclude the tax data from the tax data item which are included as a key attribute of the tax entity record for the tax entity.

12. The method of claim 10, further comprising: the computer, by the computerized tax return preparation application, determining a data type for the tax data in the tax data item and a tax topic to which the tax data item pertains.

13. The method of claim 10, wherein the matching algorithm comprises a fuzzy comparison algorithm.

14. The method of claim 10, further comprising the computer, by the computerized tax return preparation application:
analyzing the tax data item by parsing the tax data contained in the tax data item and determining one or more data values in the tax data item; and
classifying each data value as being of a particular type of data.

15. The method of claim 10, wherein the matching algorithm utilizes the length of the data strings in determining a matching score such that the matching algorithm assigns a better matching score the longer the string that matches between two data values being compared.

16. An article of manufacture comprising a non-transitory computer program carrier readable by a computer utilized by a user and embodying instructions of a computerized tax return preparation application operable to generate an electronic tax return and executable by a processor of the computer to perform a computer-implemented method comprising:
electronically accessing a tax data item having tax data regarding a tax entity;
storing in a database one or more tax entity records wherein each tax entity record includes key attributes regarding a respective tax entity;
for each tax entity, identifying a respective first key attribute value of a first type from the respective tax entity record;
for each tax entity, identifying a respective second key attribute value of a second type from the respective tax entity record;
identifying a first data value of a tax data item regarding a first tax concept, the first data value being of the first type;
identifying a second data value of the tax data item regarding the first tax concept, the second data value being of the second type;
for each tax entity, comparing the respective first key attribute value to the first data value and computing a first matching score for each tax entity using a matching algorithm and a first matching rule configured to compare a first key attribute field value of a tax entity and a first field value of a tax data item for the first tax concept;
for each tax entity, comparing the respective second key attribute value to the second data value and computing a respective second matching score for each tax entity using the matching algorithm and a second matching rule configured to compare a second key attribute field value of a tax entity and a second field value of a tax data item for the first tax concept;
for each tax entity, combining the first matching score and second matching score to obtain a respective composite matching score for each tax entity;
determining a matching tax entity comprising a match between one of the tax entities and the tax data item using the composite matching scores, wherein determining a match between one of the tax entities and the tax data item, comprises:
when there is a single tax entity having a composite matching score indicating the most likely match between a tax entity and the tax data item, then the computer, by the computerized tax return preparation application, determining such tax entity to be the matching tax entity;
when there are more than one tax entity having a composite matching score indicating the most likely match between the tax entities and the tax data item, then the computer, by the computerized tax return preparation application, requesting a user to identify a matching tax entity from the tax entities having the best composite matching score, receiving a selection of the matching tax entity from the user, and the computer, by the computerized tax return preparation application, determining the selected matching tax entity to be the matching tax entity;
when none of the tax entities have at least a predetermined minimum matching score, then the computer, by the computerized tax return preparation application, performing at least one of the following:
a) requesting a user to select a tax entity which matches the tax data item from the tax entities having the best composite matching score, receiving a selection of the selected tax entity from the user, and determining the selected tax entity to be the matching tax entity; or
b) obtaining additional matching data from the tax data item and one or more additional key attribute field values, comparing the additional matching data to the one or more additional key attribute field values using the matching algorithm and respective one or more additional matching rules and computing an additional matching score, combining the additional matching score with the composite matching score for each tax entity to determine an updated composite matching score, determining a tax entity having the revised composite matching score indicating the most likely match, and determining such tax entity to be the matching tax entity; or
c) asking the user if the user wants to add a new tax entity which matches the tax data item, wherein the new tax entity does not already have a tax entity record in the database of tax entity records, and determining the new tax entity to be the matching tax entity;

associating the matching tax entity with the tax data from tax data item by generating a data ownership record; and storing the data ownership record in the database.

17. The article of claim 16, wherein the computer-implemented method further comprises: generating a normalized data set for the tax data item in which the normalized data set is associated with the tax entity and the normalized data set is optimized to exclude the tax data from the tax data item which are included as a key attribute of the tax entity record for the tax entity.

18. The article of claim 16, wherein the computer-implemented method further comprises: determining a data type for the tax data in the tax data item and a tax topic to which the tax data item pertains.

19. The article of claim 16, wherein the matching algorithm comprises a fuzzy comparison algorithm.

20. The article of claim 16, wherein the computer-implemented method further comprises:
analyzing the tax data item by parsing the tax data contained in the tax data item and determining one or more data values in the tax data item; and
classifying each data value as being of a particular type of data.

21. The article of claim 16, wherein the matching algorithm is configured to utilize the length of the data strings in determining a matching score such that the matching algorithm assigns a better matching score the longer the string that matches between two data values being compared.

* * * * *